March 27, 1951 M. F. FEHN 2,546,539
VERTICALLY ADJUSTABLE FURNITURE TRUCK
Filed Feb. 14, 1950 2 Sheets-Sheet 1
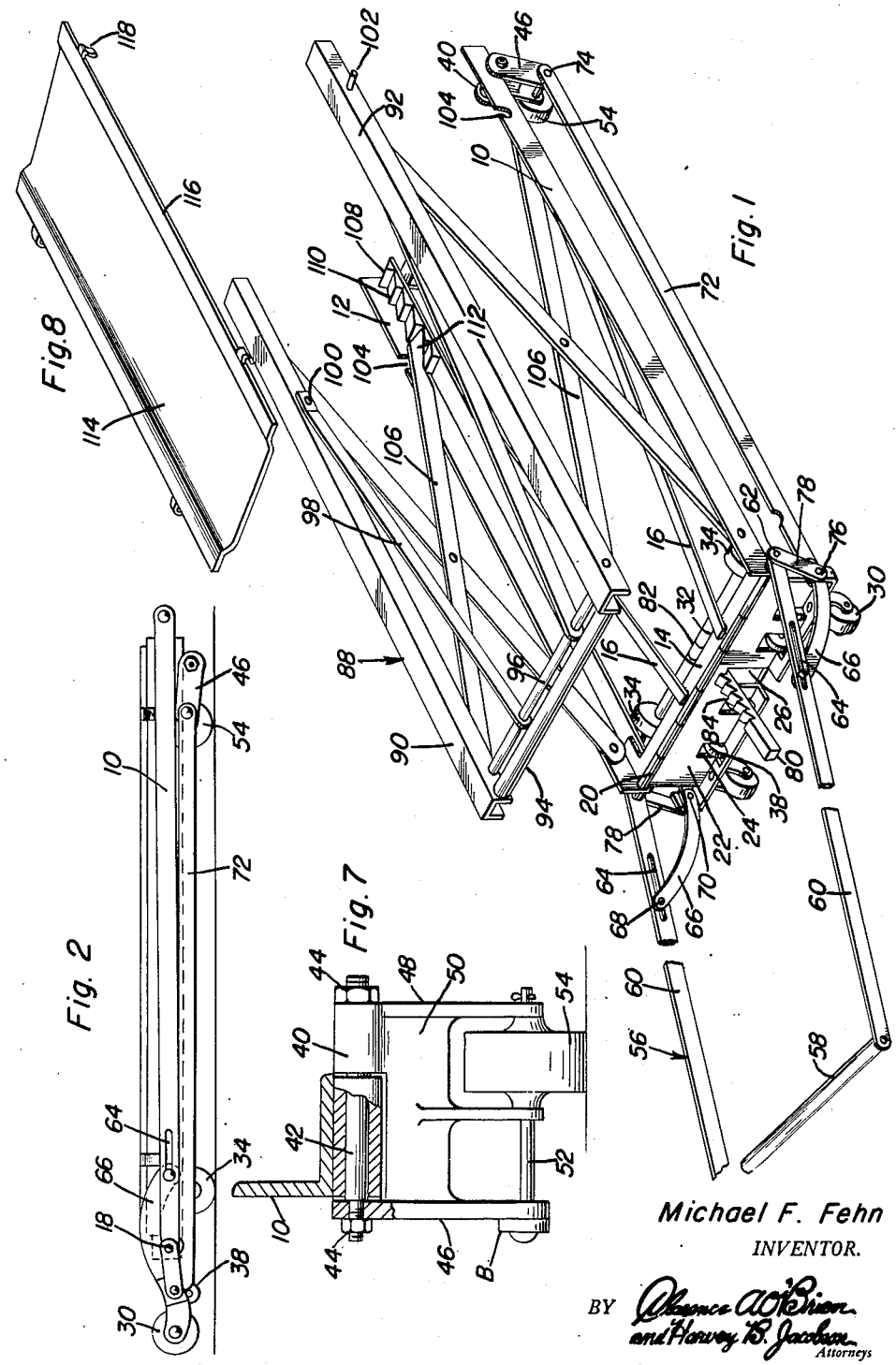
Michael F. Fehn
INVENTOR.

March 27, 1951     M. F. FEHN     2,546,539
VERTICALLY ADJUSTABLE FURNITURE TRUCK
Filed Feb. 14, 1950     2 Sheets-Sheet 2
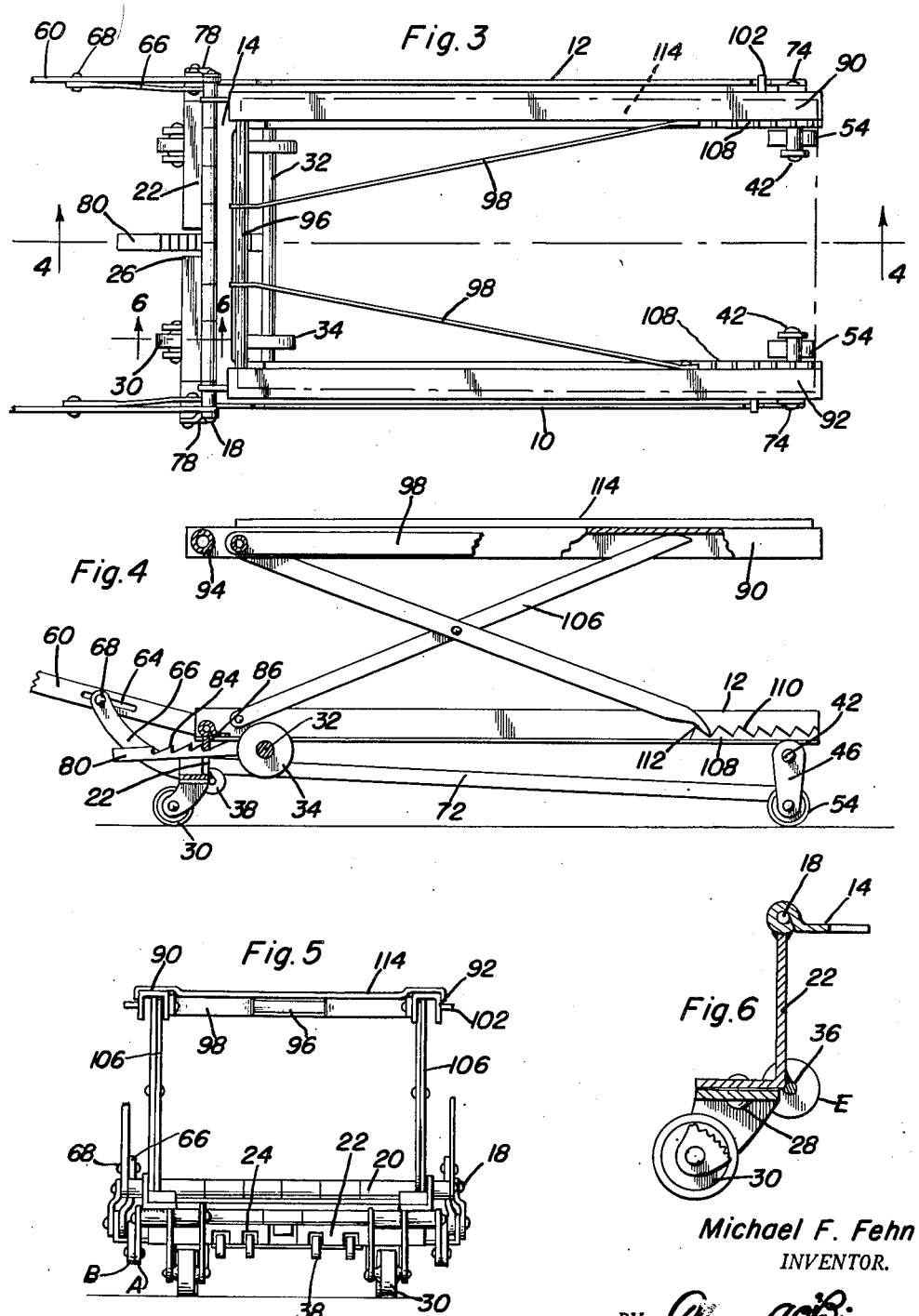
Michael F. Fehn
INVENTOR.

Patented Mar. 27, 1951

2,546,539

UNITED STATES PATENT OFFICE 2,546,539

VERTICALLY ADJUSTABLE FURNITURE TRUCK

Michael F. Fehn, Philadelphia, Pa.

Application February 14, 1950, Serial No. 144,076

8 Claims. (Cl. 280—44)

This invention relates to a truck of novel design and sturdy construction the primary object of which is to enable one to quickly and effectively raise and move household furniture with a minimum of effort and a maximum of safety.

An important object of this invention is to provide a furniture truck which can be collapsed to occupy a small space so that the truck can be unobtrusively stored under a sofa or in another convenient place.

Yet another object of the invention is to provide a truck which is readily adaptable for use under relatively low furniture, the truck having an open end so that it can straddle legs for proper positioning under an article of furniture.

A further object of the invention is to provide a furniture truck comprising a carriage having side bars and a front bar interconnecting the forward ends of said side bars, a pair of wheels rotatably mounted on said carriage behind said front bar, a transverse rod secured between said side bars adjacent said front bar, a plate vertically pivoted to said rod, caster wheels carried adjacent the ends of said plate, a pair of rear wheels, means pivotally securing said rear wheels to the rear ends of said side bars, further bars terminally pivoted to said plate and said first means, a handle vertically pivoted to said transverse rod, and link means interconnecting said handle and said plate whereby said caster wheels and said rear wheels will be raised upon upward movement of said handle, said carriage settling upon said first pair of wheels and said rear wheels.

These together with various ancillary objects and features of the invention which will later become apparent as the following description proceeds, are attained by the device, a preferred embodiment of which has been illustrated by way of example only in the accompanying drawings, wherein:

Figure 1 is a perspective view of the truck;

Figure 2 is a side elevation of the truck in a collapsed position;

Figure 3 is a top plan view of the truck;

Figure 4 is a sectional view taken on the line 4—4 of Figure 3;

Figure 5 is a rear elevational of the truck;

Figure 6 is a sectional view taken on the line 6—6 of Figure 3;

Figure 7 is a fragmentary rear view partially in section of the rear end of the truck carriage;

Figure 8 is a perspective view of a removable shelf positionable on the truck.

Specific reference is now made to the drawings. In the several views in the accompanying drawings and in the following specification reference characters indicate corresponding elements throughout.

The present truck is fabricated of suitable metal and includes a carriage comprising a pair of angle side bars 10 and 12 interconnected at their forward ends by a front bar 14 and including divergent brace bars 16 terminally welded or secured to said side bars and front bar. Extending forward of the front bar and secured at its ends to the side bars is a rod 18 upon which is hinged or pivoted for vertical movement as at 20 an L-shaped front plate 22 having spaced small notches 24 and a relatively large central notch 26. Secured as at 28 to the horizontal leg of the L-shaped plate adjacent the sides thereof are caster wheels 30.

Secured between the side bars 10 and 12 to the rear of the front bar 14 is a further transverse rod 32 upon which is rotatably mounted a pair of wheels 34. Welded to the L-shaped plate 22 at its corner is another rod 36 upon which is rotatably mounted transversely spaced small wheels 38 which extend partially through the smaller notches 24 and serve a purpose later to be described.

Welded to the horizontal rear edge of each of the side angles 10 and 12 is a sleeve 40, see Fig. 7, journaling a stub shaft 42 to the ends of which are secured as at 44 links 46 and 48 carrying a plate 50 therebetween. A further stub shaft 52 extends between the bottom ends of the links and rotatably secures a wheel 54, it being understood that there are two such wheels adjacent the rear ends of the side bars.

A means is provided for adjustably raising the caster wheels 30 and the rear wheels 54 which means comprises a handle 56 having a cross bar 58 secured between side arms 60. The side arms are pivotally secured for vertical movement on the rod 18 as at 62 and include longitudinal slots 64 adjacent their pivoted ends. Arcuate bars 66 are pivoted as at 68 through the slots 64 at one end and secured at the other as at 70 to the side portions of the plate 22. Elongated bars 72 extend along the sides of the carriage, the rear ends of which are secured as at 74 to the links 46. At their forward ends, these bars are secured as at 76 to the arcuate bars 66 and the side portions of the plate 22, links 78 being provided which are terminally pivoted to the ends of the rod 18 and the side portions of the plate 22. When the handle is moved upwardly the plate 22 and casters 30 move upwardly also while the rear wheels move forwardly and slightly upwardly so that the carriage is lowered and settles upon the wheels 34 and 54 as shown clearly in Figure 2. To retain the carriage in adjusted raised or lowered position, a bar 80 is provided which is pivoted at its rear as at 82 to the rod 32, the bar including rearwardly inclined teeth 84 adapted to engage the upper edge 86 of the plate 22 at the notch 26 through which the toothed bar extends.

A collapsible frame 88 is carried on the carriage and includes U-shaped side members 90 and 92 secured together at their forward ends by means of a transverse handle 94. A further rod 96 interconnects the side members and secures rearwardly divergent brace members 98 which are secured as at 100 to the side members. The side members include transverse stub handles 102 receivable in slots 104 in the upper rear edges of the side bars 10 and 12 when the frame is in a collapsed position as shown in Figures 2 and 3. Pivotally interconnecting the side members of the frame with the side bars of the carriage are lazy tongs 106. The rear horizontal leg portion of each side angle 10 and 12 is provided with a rack bar 108 having forwardly inclined teeth 110. One link or bar of each of the lazy tongs includes a rear hook portion 112 adapted to engage each rack bar and retain the frame in vertically adjusted position on the carriage. A removable shelf 114 may be provided for positioning on the side members of the frame, the shelf including longitudinal side flanges 116 for engaging the side members and hooks 118 for gripping the latter.

In use, the operator depresses the toothed bar 80 with his foot and raises the handle 56 upwardly to raise the casters 30 and lower the carriage on the front and rear wheels 34 and 54, the toothed bar 80 reengaging the plate 22 to keep it in a fixed position. The truck is then moved under an article of furniture, straight or with the rear open end straddling a leg. Either by handle 94 or stub handles 102, the frame 88 is lifted so that the shelf 114 engages the underside of the furniture and the hooks 112 of the lazy tongs engage one of the teeth 110 of the racks 108. The handle 56 is then moved downwardly, after release of the toothed bar 80, lowering the casters 30 and the rear wheels 54 and in effect elevating the carriage, frame and furniture thereon. After the toothed bar 80 again lockingly engages the plate 22 at the notch 24, the truck is pulled along the ground to the desired place. The frame 88 may be collapsed by simply raising the side members at the stub handles 102 and tilting the frame slightly in a forward direction so that the hooks 112 clear the rack bars 108.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A furniture truck comprising a carriage having side bars and a front bar interconnecting the forward ends of said side bars, a pair of wheels rotatably mounted on said carriage behind said front bar, a transverse rod secured between said side bars adjacent said front bar, a plate vertically pivoted to said rod, caster wheels carried adjacent the ends of said plate, a pair of rear wheels, means pivotally securing said rear wheels to the rear ends of said side bars, further bars terminally pivoted to said plate and said first means, a handle vertically pivoted to said transverse rod, and link means interconnecting said handle and said plate whereby said caster wheels and said rear wheels will be raised upon upward movement of said handle, said carriage settling upon said first pair of wheels and said rear wheels.

2. The combination of claim 1 and a means for locking said plate in adjusted vertical position relative to said carriage.

3. The combination of claim 2 wherein said locking means includes a toothed bar pivoted at its rear end to said carriage and a notch in said plate, the upper wall of which notch is adapted to engage a selected tooth in said toothed bar.

4. The combination of claim 1 and an adjustably foldable frame secured upon said carriage.

5. The combination of claim 4 wherein said frame includes side members and a handle interconnecting said side members, lazy tongs interconnecting said side bars and said side members, and means for retaining said frame in adjusted vertical position on said carriage.

6. The combination of claim 5 wherein said adjustable retaining means includes rack bars carried at the rear ends of said side bars, said lazy tongs including links having hook ends engageable with said rack bars.

7. The combination of claim 1 wherein said link means includes slots in the leg portions of said handle, arcuate bars pivoted to the sides of said plates and to the leg portions at said slots, and links each secured at one end to said transverse rod and pivoted at its other end to said further bars and said arcuate bars.

8. The combination of claim 1 and a means for preventing said plate from striking the ground as said caster wheels are lowered in response to a downward movement of said handle, said last named means including transversely spaced small wheels rotatably secured to said plate immediately to the rear of said caster wheels.

MICHAEL F. FEHN.

REFERENCES CITED

The following references are of record in the file of this patent:

UNITED STATES PATENTS

| Number | Name | Date |
|---|---|---|
| 1,301,616 | Stephenson et al. | Apr. 22, 1919 |
| 1,360,208 | Gamble et al. | Nov. 23, 1920 |
| 1,564,713 | Reiter | Dec. 8, 1925 |
| 1,890,361 | Beattie | Dec. 6, 1932 |
| 2,429,723 | Kelley | Oct. 28, 1947 |